United States Patent [19]

Spindler

[11] Patent Number: 5,626,685
[45] Date of Patent: May 6, 1997

[54] METHOD OF REMOVING A WATER INSOLUBLE SURFACE COATING FROM A SURFACE

[76] Inventor: William E. Spindler, 5505 S. Wayne Ave., Fort Wayne, Ind. 46807

[21] Appl. No.: 248,631

[22] Filed: May 24, 1994

Related U.S. Application Data

[63] Continuation of Ser. No. 683,491, Apr. 9, 1991, abandoned, which is a continuation of Ser. No. 331,061, Mar. 28, 1989, abandoned, which is a continuation of Ser. No. 218,498, Jul. 5, 1988, abandoned, which is a continuation of Ser. No. 110,045, Oct. 13, 1987, abandoned, which is a continuation of Ser. No. 788,910, Oct. 18, 1985, abandoned.

[51] Int. Cl.$^6$ ............................................. B08B 7/00
[52] U.S. Cl. .................................. 194/40; 134/1
[58] Field of Search ................................. 134/40, 1

[56] References Cited

U.S. PATENT DOCUMENTS

| | | | |
|---|---|---|---|
| 2,564,129 | 8/1951 | Rotelli | 134/38 |
| 3,553,144 | 1/1971 | Murphy | 134/38 |
| 3,622,516 | 11/1971 | Shen et al. | 252/109 |
| 3,650,831 | 3/1972 | Jungermann et al. | 134/40 |
| 3,669,740 | 6/1972 | Yamamoto et al. | 134/38 |
| 3,870,647 | 3/1975 | Travers | 252/117 |
| 3,926,828 | 12/1975 | O'Neill et al. | 252/117 |
| 4,090,001 | 5/1978 | Mertzweiller nee Maillard | 134/38 |
| 4,168,989 | 9/1979 | Edelman et al. | 134/38 |
| 4,284,434 | 8/1981 | Lingmann et al. | 134/40 |
| 4,297,229 | 10/1981 | Speak et al. | 252/109 |
| 4,430,245 | 2/1984 | Beattie | 252/117 |
| 4,517,025 | 5/1985 | Plante et al. | 134/38 |
| 4,540,442 | 9/1985 | Smith et al. | 134/38 |

FOREIGN PATENT DOCUMENTS

| | | | |
|---|---|---|---|
| 2415127 | 3/1973 | Germany | 252/DIG. 8 |
| 3814016 | 8/1963 | Japan | 252/109 |
| 6047496 | 4/1981 | Japan | 252/117 |
| 3814016 | 12/1992 | Japan . | |
| 6606749 | 11/1966 | Netherlands | 134/38 |
| 834118 | 6/1981 | U.S.S.R. | 252/117 |
| 0000238 | 1/1864 | United Kingdom | 252/109 |
| 730894 | 6/1955 | United Kingdom | 252/109 |
| 737824 | 10/1955 | United Kingdom | 134/38 |
| 2131827 | 6/1984 | United Kingdom | 134/38 |

*Primary Examiner*—Asok Pal
*Attorney, Agent, or Firm*—Baker & Daniels

[57] ABSTRACT

A method of removing a water insoluble surface coating from a surface comprising applying to the coating a liquid comprising between about 0.25 weight percent to about 99.9 weight percent of a fatty acid selected from the group consisting of unsaturated fatty acids, saturated fatty acids, polyunsaturated fatty acids and mixtures thereof, an organic or inorganic alkaline builder present in an amount effective to saponify the fatty acid and still maintain the constituents in solution, and the balance of the liquid is water.

9 Claims, No Drawings

METHOD OF REMOVING A WATER INSOLUBLE SURFACE COATING FROM A SURFACE

This is a continuation of application Ser. No. 07/683,491, filed Apr. 9, 1991, which was a continuation of application Ser. No. 07/331,061, filed Mar. 28, 1989, which was a continuation of Ser. No. 07/218,498, filed Jul. 5, 1988, which was a continuation of application Ser. No. 07/110, 045, filed Oct. 13, 1987, which was a continuation of application Ser. No. 06/788,910, filed Oct. 18, 1985, now all abandoned.

BACKGROUND OF THE INVENTION

The invention is directed to a method of removing a water insoluble surface coating from a surface wherein there is applied ho the coating a liquid, and more specifically, to such a method wherein the liquid comprises a fatty acid, an alkaline builder reactive with the fatty acid to provide a saponified fatty acid, and, optionally, a surfactant.

In the case of applying liquid surface coatings, such as paints, varnishes or stains, a brush is oftentimes utilized to accomplish the application. As can be appreciated, after the completion of the application the brush remains saturated with the coating material. In view of the cost of the brush, especially in the case of higher quality brushes, the user typically will not discard the brush, but will, instead, attempt to clean the brush by removing the coating material therefrom. In the past, this has been accomplished in a number of ways.

In the case of water based coatings, such as modern Latex paints, the brush can be cleaned by immersion into water, or preferably, hot soapy water. The use of water or water containing soap has proven to provide a satisfactory way in which to remove water based (water soluble) liquid coatings from the applicator brush. However, these water immersion techniques have not proven satisfactory in removing hardened water based coatings from brushes.

In the case of oil based or solvent based coatings, which are water insoluble, the user has been required to use a solvent based cleaner to remove these types of liquid coatings from the brush. Although these types of cleaners have performed satisfactorily in removing these liquid coatings, problems exist with respect to the storage, usage and disposal of these cleaners. For example, solvent and oil based cleaners are typically highly flammable, and consequently, certain precautions must be taken in storing these cleaners. Further, due to their solvent based nature, these cleaners when exposed to the atmosphere emit odorous fumes which in some cases cause user discomfort as well as can be hazardous to the user absent proper ventilation. As a further disadvantage, the user must take certain special precautions in discarding spent cleaning solution in view of its flammability and toxicity.

It should now be appreciated that problems exist with removing hardened dried water based surface coatings, which have now become water insoluble on drying, from brushes since solvent based types of cleaners must be utilized. However, as previously mentioned, the use of solvent based cleaners have certain problems associated with their use. Further, as can be appreciated, there exist problems associated with removing both liquid and solid oil based or solvent based surface coatings, which are water insoluble, from brushes since solvent-based types of cleaners must be used with their attendant problems as described above.

SUMMARY OF THE INVENTION

The present invention overcomes the above-discussed problems associated with using solvent based types of cleaners and provides the inherent advantages associated with using a water based cleaner by providing a method for removing water insoluble surface coatings from a surface wherein there is applied to the surface a liquid which is a water based liquid that includes a saponified fatty acid.

In one form thereof, the invention is the method of removing a water soluble surface coating from a surface comprising applying thereto a liquid comprising a fatty acid selected from the group consisting of unsaturated fatty acids, saturated fatty acids, polyunsaturated fatty acids and mixtures thereof, said fatty acid having between 10 and 26 carbon atoms and being present in an amount between about 0.25 weight percent to about 99.9 weight percent of the liquid. An inorganic alkaline builder selected from the group consisting of silicates, borates, carbonates, hydroxides, bicarbonates and mixtures thereof, said inorganic alkaline builder being present in an amount effective to saponify the fatty acid and still maintain the constituents in solution. The balance of the liquid is water.

In another form thereof, the invention is a method of removing a water insoluble surface coating from a surface comprising applying to the coating a liquid comprising a fatty acid selected from the group consisting of unsaturated fatty acids, saturated fatty acids, polyunsaturated fatty acids and mixtures thereof, said fatty-acid having between 10 and 26 carbon atoms and being present in an amount between about 0.25 weight percent to about 99.9 weight percent of the liquid. The liquid builder further comprises an organic alkaline builder selected from the group consisting of monoethanolamine, diethanolamine, triethanolamine, and morpholine in an amount effective to saponify the fatty acid and still maintain the constituents in solution. The balance of the liquid is water.

DETAILED DESCRIPTION

The invention is directed to a method of removing a water insoluble surface coating from a surface that comprises application to the coating of a liquid which, generally speaking, in one form thereof comprises a fatty acid, an inorganic alkaline builder used to saponify the fatty acid, and, as an optional constituent, an effective surfactant. The method of the invention also contemplates using a liquid which, generally speaking, comprises a fatty acid and an organic alkaline builder such as monoethanolamine, diethanolamine, triethanolamine or morpholine to saponify the fatty acid. The method also contemplates using liquids of either of the above general compositions wherein the liquid is produced by applying heat to a solid substance. As can be appreciated, the class of water insoluble surface coatings would include hardened surface coatings which in their liquid state would have been water soluble, oil based or solvent based surface coatings in their liquid state, and oil based or solvent based liquid coatings in their solid or hardened state.

The method utilizes a liquid which is water based, and consequently, does not have attendant therewith those problems that are associated with utilizing solvent based cleaners. Such problems include storage of the cleaner since it can be highly flammable, ventilation during use of the cleaner due to emission of odorous and potentially harmful fumes, and proper disposal of the spent cleaner due to the flammability and toxicity of the cleaner.

Referring to the first general composition of the liquid utilized by the method, the liquid is comprised of between about 0.25 weight percent to about 99.9 weight percent of a fatty acid of either the saturated, unsaturated or polyunsaturated type or mixtures thereof having between ten and twenty-six carbon atoms. The liquid further includes an inorganic alkaline builder which is utilized to saponify the fatty acid. The inorganic alkaline builder is present in an effective amount to saponify the fatty acid to practical solubility limits in that the constituents are maintained in solution. Inorganic alkaline builders which have performed satisfactorily include phosphates, silicates, borate and carbonates. Although not tested, it would be expected that other types of inorganic alkaline builders such as hydroxides and bicarbonates would perform satisfactorily. As an optional constituent to the liquid there can be provided a surfactant, of either a nonionic, anionic, cationic or amphoteric type, that is present in an amount that is effective to form a homogeneous mixture with the other constituents. The balance of the liquid is water in an amount effective to maintain the constituents in solution.

Referring to the second general composition of the liquid utilized by the method, the liquid is comprised of between about 0.25 weight percent and about 99.9 weight percent of a fatty acid of the saturated, unsaturated or polyunsaturated types or mixtures thereof having between ten and twenty-six carbon atoms. The liquid further includes an organic alkaline builder, such as monoethanolamine, diethanolamine, triethanolamine or morpholine in an amount effective to saponify the fatty acid to practical solubility limits in that the constituents are maintained in solution. As an optional constituent to the liquid there can be provided a surfactant, of either a nonionic, anionic, cationic or amphoteric type, that is present in an amount that is effective to form a homogeneous mixture with the other constituents. The balance of the liquid is water in an amount effective to maintain the constituents in solution.

The following tests were carried out wherein a paint applicator, namely a brush, was dipped into a paint of the following composition:

| | |
|---|---|
| Pigment (Carbon Black) | 3.9% by weight |
| Tall Oil Alkyd Soya Resin Solids | 44.4% by weight |
| Mineral Spirits | 49.7% by weight |
| Driers | 2.0% by weight |

After thoroughly wetting the paint brush with the above paint composition, the brush was allowed to air dry from between five to ten minutes then a sample of the specific formulation to be tested was worked into the brush followed by a rinse in warm water and this procedure was repeated two more times. Then a second new portion of the formulation was taken and the process of working the formulation into the brush was repeated three times. Finally, a third portion of the formulation was taken and the process of working the formulation into the brush was repeated three times. If after three fresh samples of formulation to be tested (in that nine total treatments were made to the brush) all the paint was not removed, the product was designated to be unsatisfactory. The surfactants used in the testing were TRITON X-100 sold by Rohm and Haas and is of the formulation

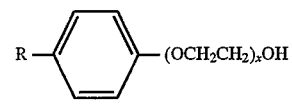

wherein x is 9 or 10 and R is $C_8H_{17}$; TRITON X-102 sold by Rohm and Haas which is of the same type as TRITON X-100 but x equals 12 or 13 and R is $C_8H_{17}$; TRITON N-101 sold by Rohm and Haas which is of the same type as TRITON X-100 but x equals 9 or 10 and R is $C_9H_{19}$; and TERGITOL 15-S-9 sold by Union Carbide and is of the formulation $C_{12-14} H_{25-29} O(CH_2CH_2O)_9 CH_2CH_2OH$. The results of the testing is set out below.

| Sample | Specific Formulation (wt %/Constituent) | Results of Testing |
|---|---|---|
| 1 | 85.5% Water<br>5.5% Triton X-100<br>4.0% Oleic Acid<br>6.9% $Na_2 B_4 O_7$ | Cleans brush |
| 2 | 80.7% Water<br>5.2% Triethanolamine<br>3.8% Oleic Acid<br>8.3% $Na_3 PO_4$ 12 $H_2O$<br>2.0% $Na_2 SiO_3$ 5 $H_2O$ | Cleans brush |
| 3 | 85.3% Water<br>5.5% Triton X-102<br>4.0% Oleic Acid<br>5.0% $Na_2 CO_3$ | Cleans brush |
| 4 | 80.7% Water<br>5.2% Triton N-101<br>3.8% Oleic Acid<br>8.3% $Na_3 PO_4$ 12 $H_2O$<br>2.0% $Na_2 SiO_3$ 5 $H_2O$ | Cleans brush |
| 5 | 80.7% Water<br>5.2% Triton N-101<br>3.8% Oleic Acid<br>8.3% $Na_3 PO_4$ 12 $H_2O$<br>2.0% $Na_2 SiO_3$ 5 $H_2O$ | Cleans brush |
| 6 | 85.1% Water<br>4.0% Oleic Acid<br>8.7% $Na_3 PO_4$ 12 $H_2O$<br>2.2% $Na_2 SiO_3$ 5 $H_2O$ | Cleans brush |
| 7 | 80.7% Water<br>5.2% Tergitol 15-S-9<br>3.8% Oleic Acid<br>8.3% $Na_3 PO_4$ 12 $H_2O$<br>2.0% $Na_2 SiO_3$ 5 $H_2O$ | Cleans brush |
| 8 | 80.7% Water<br>5.2% Triton X-100<br>3.8% Linoleic Acid<br>8.3% $Na_3 PO_4$ 12 $H_2O$<br>2.0% $Na_2 SiO_3$ 5 $H_2O$ | Cleans brush |
| 9 | 80.7% Water<br>5.2% Triton X-100<br>3.8% Stearic Acid<br>8.3% $Na_3 PO_4$ 12 $H_2O$<br>2.0% $Na_2 SiO_3$ 5 $H_2O$ | Cleans brush |
| 10 | 80.7% Water<br>5.2% Triton X-100<br>3.8% Empol 1014 (Dimer Acid)<br>8.3% $Na_3 PO_4$ 12 $H_2O$<br>2.0% $Na_2 SiO_3$ 5 $H_2O$ | Did not clean brush |
| 11 | 80.7% Water<br>5.2% Triton X-100<br>3.8% Soya (Soybean) Oil<br>8.3% $Na_3 PO_4$ 12 $H_2O$<br>2.0% $Na_2 SiO_3$ 5 $H_2O$ | Did not clean brush (Two phase system) |
| 12 | 80.7% Water<br>5.2% Triton X-100<br>2.0% Oleic Acid<br>1.7% Stearic Acid<br>8.3% $Na_3 PO_4$ 12 $H_2O$<br>2.0% $Na_2 SiO_3$ 5 $H_2O$ | Cleans brush |

-continued

| Sample | Specific Formulation (wt %/Constituent) | Results of Testing |
|---|---|---|
| 13 | 80.7% Water<br>5.2% Triton X-100<br>2.6% Linoleic Acid<br>1.3% Stearic Acid<br>8.3% $Na_3 PO_4$ 12 $H_2O$<br>2.0% $Na_2 SiO_3$ 5 $H_2O$ | Cleans brush |
| 14 | 80.7% Water<br>5.2% Triton X-100<br>3.8% Capric Acid<br>8.3% $Na_3 PO_4$ 12 $H_2O$<br>2.0% $Na_2 SiO_3$ 5 $H_2O$ | Did not clean brush |
| 15 | 80.7% Water<br>5.2% Triton X-100<br>3.8% Caprylic Acid<br>8.3% $Na_3 PO_4$ 12 $H_2O$<br>2.0% $Na_2 SiO_3$ 5 $H_2O$ | Did not clean brush |
| 16 | 80.7% Water<br>5.2% Triton X-100<br>3.8% Lauric Acid<br>8.3% $Na_3 PO_4$ 12 $H_2O$<br>2.0% $Na_2 SiO_3$ 5 $H_2O$ | Did not clean brush |
| 17 | 80.7% Water<br>5.2% Triton X-100<br>3.8% Myristic Acid<br>8.3% $Na_3 PO_4$ 12 $H_2O$<br>2.0% $Na_2 SiO_3$ 5 $H_2O$ | Cleans brush |
| 18 | 80.7% Water<br>5.2% Triton X-100<br>3.8% Palmitic Acid<br>8.3% $Na_3 PO_4$ 12 $H_2O$<br>2.0% $Na_2 SiO_3$ 5 $H_2O$ | Cleans brush |
| 19 | 80.7% Water<br>5.2% Triton X-100<br>3.8% Arachidic Acid<br>8.3% $Na_3 PO_4$ 12 $H_2O$<br>2.0% $Na_2 SiO_3$ 5 $H_2O$ | Cleans brush |
| 20 | 80.7% Water<br>5.2% Triton X-100<br>3.8% Linolenic Acid<br>8.3% $Na_3 PO_4$ 12 $H_2O$<br>2.0% $Na_2 SiO_3$ 5 $H_2O$ | Cleans brush |

While there have been described above the principles of this invention in connection with specific examples, it is to be clearly understood that this description is made only by way of example and not as a limitation to the scope of the invention.

What is claimed is:

1. A method of removing a water insoluble paint from a paint applicator, wherein the paint is of the type applied to a surface in liquid form and is then capable of hardening over time, said method comprising the following sequence of steps:

(a) providing an aqueous liquid consisting essentially of a mixture of the following ingredients:

a fatty acid selected from the group consisting of unsaturated fatty acids, saturated fatty acids, polyunsaturated fatty acids and mixtures thereof, said fatty acid having between 14 and 26 carbon atoms and being present in an amount between about 0.25 weight percent and about 99.9 weight percent of the aqueous liquid;

an inorganic alkaline builder selected from the group consisting of alkali phosphates, alkali silicates, alkali hydroxides, alkali borates, alkali carbonates, alkali bicarbonates and mixtures thereof, said inorganic alkaline builder being present in an amount effective to saponify the fatty acid and still maintain the constituents substantially in solution;

a surfactant in an amount effective to form a homogeneous mixture with said fatty acid and said inorganic alkaline builder; and water;

(b) applying the aqueous liquid to the paint applicator;

(c) allowing the aqueous liquid to contact the paint for a selected time; and (d) removing the liquid and paint from the applicator by rinsing the applicator in water.

2. The method of claim 1, wherein the fatty acid is oleic acid, linoleic acid, stearic acid, myristic acid, palmitic acid, arachidic acid or linolenic acid, or a blend of two or more of said fatty acids.

3. The method of claim 1, wherein the alkaline builder is an alkali phosphate, an alkali silicate or a mixture of the two.

4. The method of claim 1, wherein the surfactant is nonionic and of the general type:

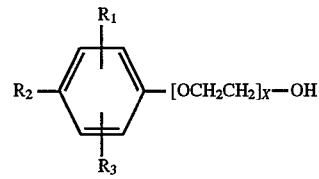

wherein $R_1$ is an alkyl group of $C_5$ to $C_{12}$, $R_2$ is hydrogen or alkyl group and $R_3$ is hydrogen or an alkyl group, and X is 8, 9, 10, 11 or 12.

5. The method of claim 1, wherein said aqueous liquid comprises at least about 80 weight percent water, about 5.0 to about 11.0 weight percent alkaline builder, and about 0.25 to about 4.0 weight percent fatty acid.

6. The method of claim 1, wherein said aqueous liquid comprises about 80 to about 85.5 weight percent water, about 5.0 to about 11.0 weight percent alkaline builder, about 5.0 to about 5.5 weight percent surfactant and about 3.7 to about 4.0 weight percent fatty acid.

7. The method of claim 1, wherein said paint applicator is a paint brush, and wherein the step of applying the aqueous liquid to the paint applicator comprises thoroughly working said aqueous liquid into the bristles of the brush upon application thereto.

8. The method of claim 1, wherein the steps of applying said aqueous liquid to the paint applicator, allowing the liquid to contact the paint for a selected time, and removing the liquid and paint from the applicator by rinsing the applicator in water are sequentially repeated at least one time.

9. The method of claim 1, wherein the method is repeated with a fresh sample of aqueous liquid at least one time.

* * * * *